US012799770B2

(12) United States Patent
Hamann

(10) Patent No.: US 12,799,770 B2
(45) Date of Patent: Nov. 17, 2026

(54) MOUNT FOR CONNECTING FENCE WIRE TO A FENCE POST

(71) Applicant: Russell Hamann, Clear Lake, SD (US)

(72) Inventor: Russell Hamann, Clear Lake, SD (US)

( * ) Notice: Subject to any disclaimer, the term of this patent is extended or adjusted under 35 U.S.C. 154(b) by 132 days.

(21) Appl. No.: 18/923,986

(22) Filed: Oct. 23, 2024

(65) Prior Publication Data

US 2026/0110188 A1 Apr. 23, 2026

(51) Int. Cl.
*E04H 17/10* (2006.01)
*E04H 17/00* (2006.01)
*H01B 17/14* (2006.01)

(52) U.S. Cl.
CPC ......... *E04H 17/124* (2021.01); *E04H 17/017* (2021.01); *H01B 17/145* (2013.01)

(58) Field of Classification Search
CPC ...... A01K 3/005; E04H 17/017; E04H 17/02; E04H 17/04; E04H 17/06; E04H 17/10; E04H 17/12; E04H 17/124; H01B 17/14; H01B 17/145
USPC ............... 174/158 F, 161 F, 163 F, 172, 173; 256/10, 48, 52, 54, 57
See application file for complete search history.

(56) References Cited

U.S. PATENT DOCUMENTS 554,977 A * 2/1896 Blecher ................. E04H 17/055 256/57
601,682 A * 4/1898 Royer ................... E04H 17/124 256/57
1,229,272 A * 6/1917 Irwin ..................... H01B 17/22 174/173
1,537,799 A * 5/1925 Chapman .............. E04H 17/124 256/57
2,172,810 A * 9/1939 Sherman .................. H02G 7/14 174/173
2,182,342 A * 12/1939 Karitzky ................... B21F 3/02 174/172
2,814,669 A * 11/1957 Mark ................... H01B 17/145 174/158 F
2,865,609 A * 12/1958 Steiner ................. H01B 17/145 256/10
3,042,745 A * 7/1962 Williams ............... H01B 17/22 174/173
3,069,491 A * 12/1962 Hayden .................. H01B 17/22 174/173
3,759,490 A * 9/1973 Heuberger .............. E04H 17/24 256/10
4,771,137 A 9/1988 Thompson
6,583,363 B1 6/2003 Wilson, Jr.

(Continued)

FOREIGN PATENT DOCUMENTS

FR 1190955 A * 10/1959 ........... H01B 17/145
FR 1232718 A * 10/1960 ........... H01B 17/145

(Continued)

*Primary Examiner* — Josh Skroupa

(57) ABSTRACT

A fence wire mount for mounting a fence wire to a fence post includes a coil formed of a wire having a pair of free ends. The coil defines a channel which extends therethrough along an axis of the coil. The coil also defines gaps between axially adjacent portions of the wire which are wide enough to accommodate a fence wire. A connector is provided which may be used to couple the coil to a post. The connector attaches to the post such that the axis of the coil extends generally horizontally.

7 Claims, 4 Drawing Sheets

(56) References Cited

U.S. PATENT DOCUMENTS

| | | | | |
|---|---|---|---|---|
| 7,051,414 | B2 * | 5/2006 | Swanson | A44C 27/00<br>24/549 |
| 11,525,278 | B2 * | 12/2022 | Hanneken | E04H 17/06 |
| 2023/0399870 | A1 * | 12/2023 | Cole | E04H 17/12 |

FOREIGN PATENT DOCUMENTS

| | | | | | |
|---|---|---|---|---|---|
| GB | 730065 | A | * | 5/1955 | H01B 17/145 |
| GB | 754049 | | | 8/1956 | |
| GB | 781933 | | | 8/1957 | |
| GB | 1587283 | A | * | 4/1961 | H01B 17/145 |
| WO | 2017018892 | | | 2/2017 | |

* cited by examiner

MOUNT FOR CONNECTING FENCE WIRE TO A FENCE POST

BACKGROUND OF THE INVENTION

(1) Field of the Invention

The disclosure relates to connectors and more particularly pertains to a new connector for mounting a fence wire to a fence post.

(2) Description of Related Art Including Information Disclosed Under 37 CFR 1.97 and 1.98

The prior art relates to various connectors for mounting fence wire to fence posts. However, the prior art fails to describe a fence wire mount which comprises a coil with two free ends and a connecting member which mounts the coil to a fence post.

BRIEF SUMMARY OF THE INVENTION

An embodiment of the disclosure meets the needs presented above by generally comprising a coil formed of a wire having a pair of free ends. The wire has a pair of end sections and a helical section, wherein each end section is adjacent to an associated free end of the coil. The helical section is coupled to and extends between the pair of end sections. The coil defines a channel which extends therethrough along an axis of the coil. The coil also defines gaps between axially adjacent portions of the wire which are wide enough to accommodate a fence wire. A connector is provided which may be used to couple the coil to a post. The connector attaches to the post such that the axis of the coil extends generally horizontally.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
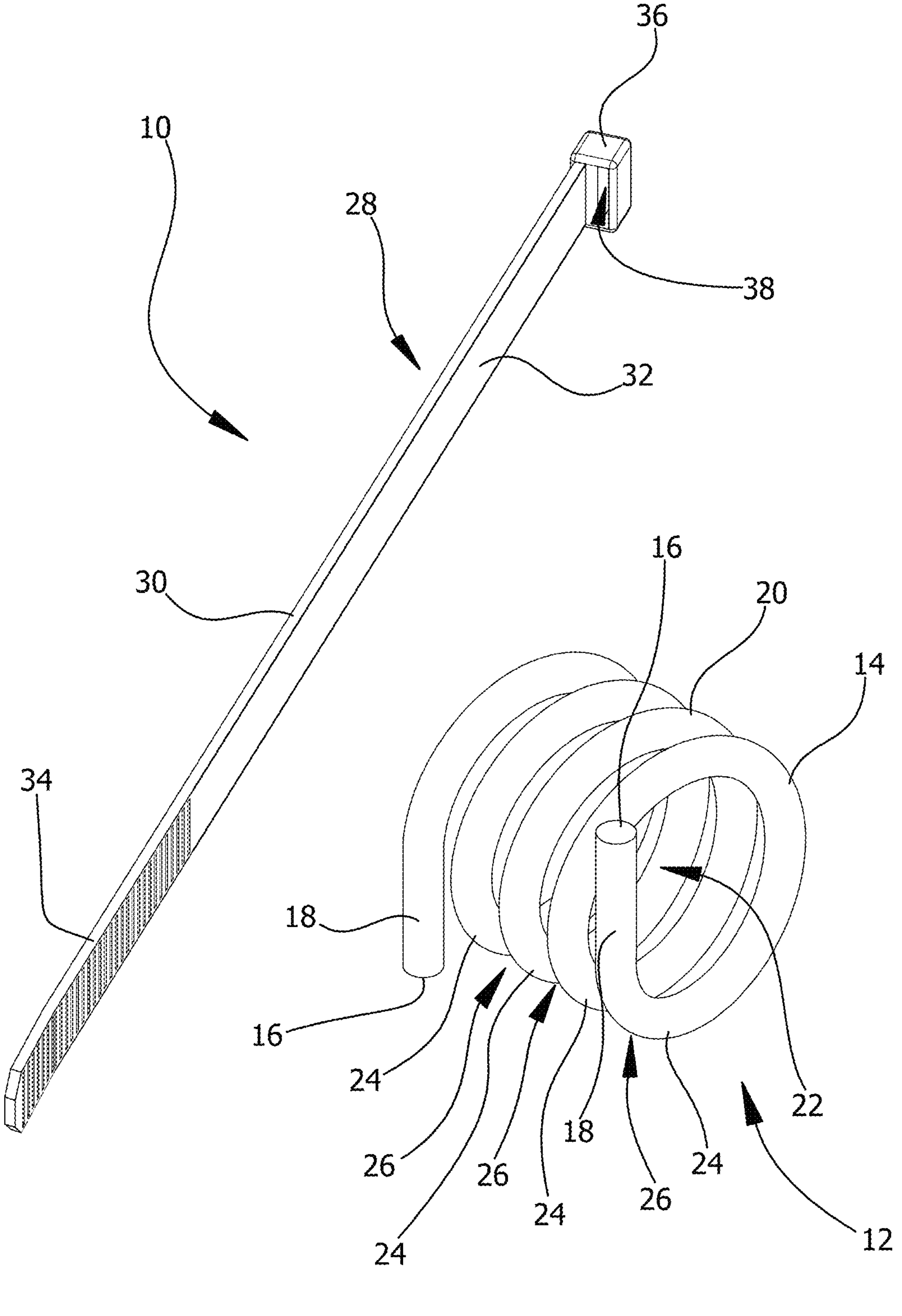
FIG. 1 is a perspective kit view of a fence wire mount according to an embodiment of the disclosure.
Figure 2:
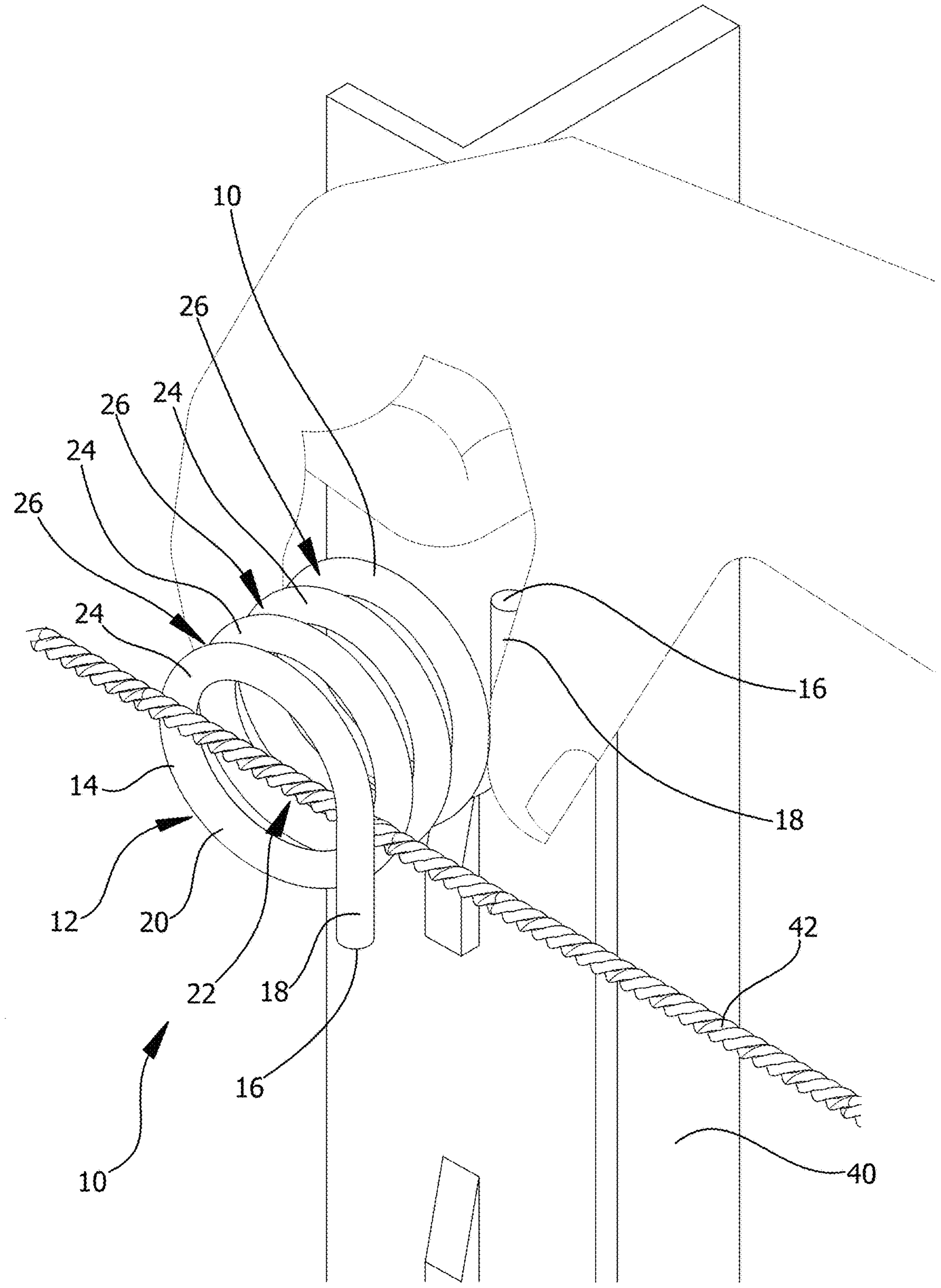
FIG. 2 is a perspective in-use view of an embodiment of the disclosure.
Figure 3:
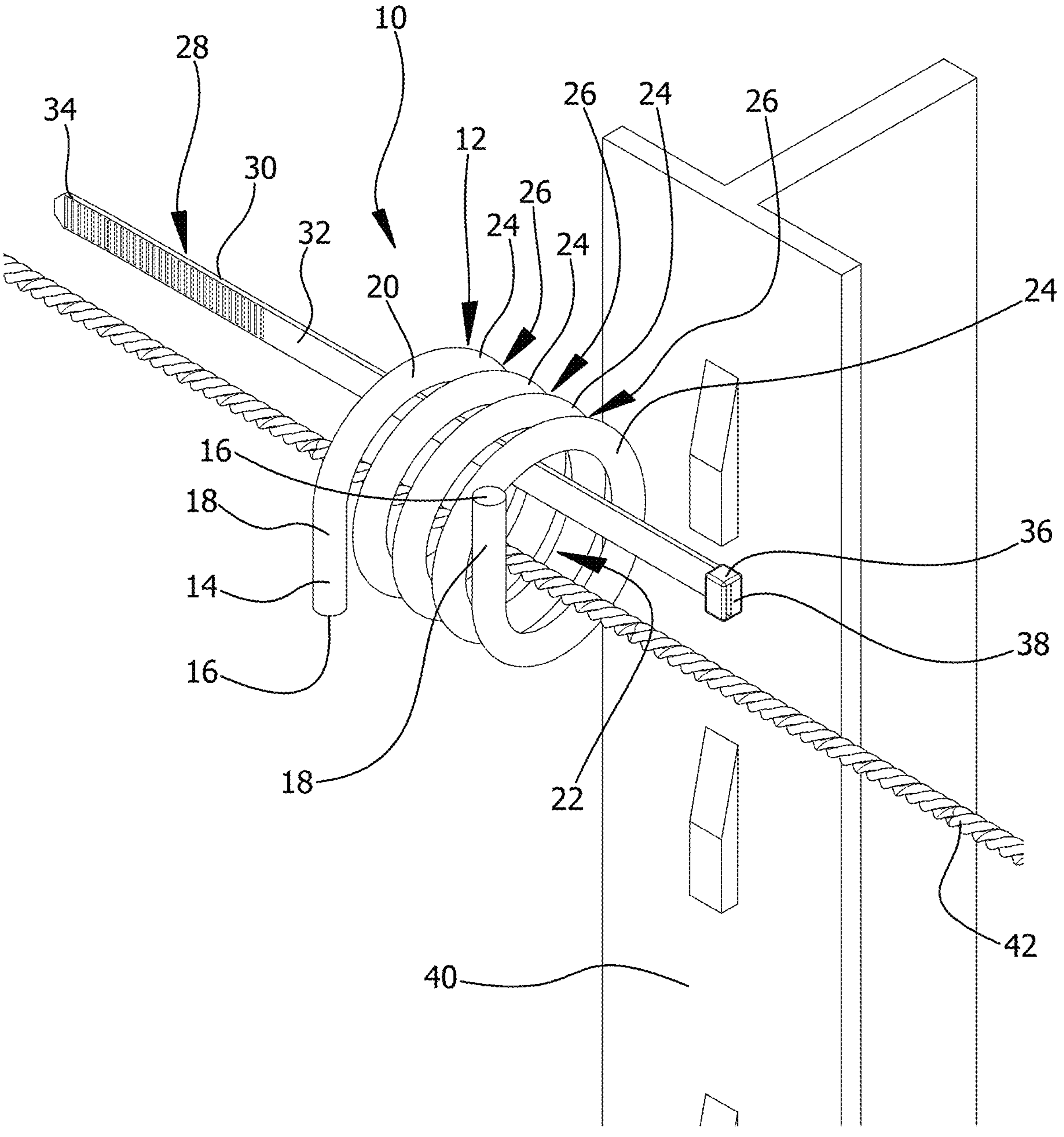
FIG. 3 is a perspective in-use view of an embodiment of the disclosure.
Figure 4:
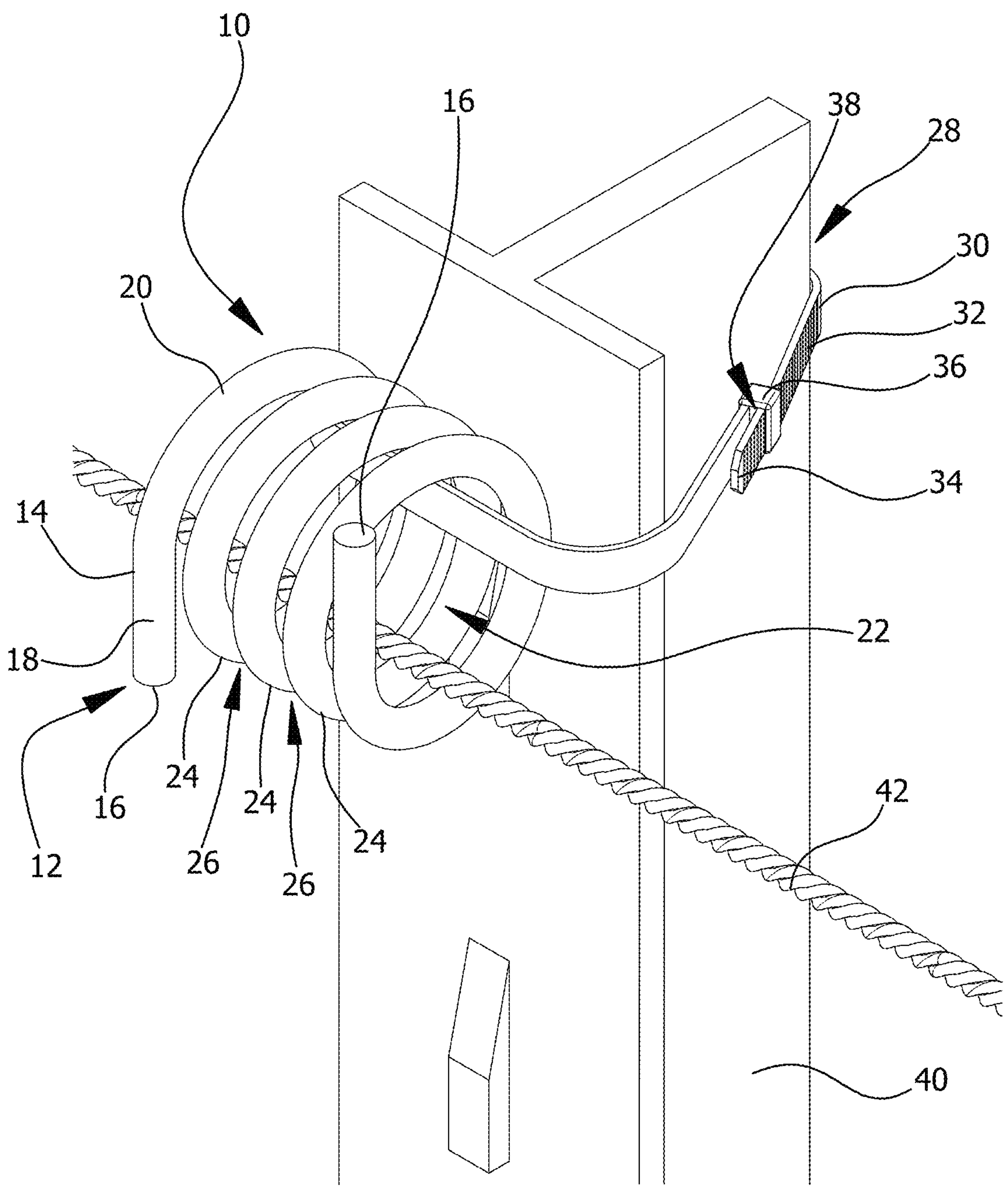
FIG. 4 is a perspective in-use view of an embodiment of the disclosure.

With reference now to the drawings, and in particular to FIGS. 1 through 4 thereof, a new connector embodying the principles and concepts of an embodiment of the disclosure and generally designated by the reference numeral 10 will be described.

As best illustrated in FIGS. 1 through 4, the fence wire mount 10 generally comprises a coil 12 made of a wire 14 which has a pair of free ends 16. The wire 14 has a pair of end sections 18 and a helical section 20. Each end section 18 is positioned adjacent to an associated one of the pair of free ends 16, and the helical section 20 is coupled to and extends between the pair of end sections 18. The coil 12 defines a channel 22 which extends therethrough along an axis of the coil 12. The coil 12 also defines gaps 26 between axially adjacent portion 24*s* of the helical section 20 of the wire 14. Each gap 26 has a width configured to accommodate a fence wire 42 therein. The helical section 20 has a constant pitch. The wire 14 comprises a flexible material such that the coil 12 may be expanded if necessary to accommodate the fence wire 42 in each gap 26. The end sections 18 of the wire 14 are straight and aligned parallel to each other. The end sections 18 are also spaced a same direction away from the axis of the coil 12.

A connector 28 is provided for coupling the coil 12 to a post 40. The post 40 depicted in the Figures generally is a T-post, but any of a variety of shapes may be suitable, including a cylinder, a rectangular prism, or the like. The connector 28 is represented in the Figures as a zip tie 30. The connector 28 is elongated and is threadable through the channel 22 of the coil 12. Then the connector 28 is attached to the post 40, such as by inserting a tail 34 of a strap 32 of the zip tie 30 into a slot 38 of a head 36 of the zip tie 30 and cinching the zip tie 30 against the post 40. The connector 28 comprises a flexible material such that the connector 28 may wrap around the post 40 substantially as described.

In another embodiment, the connector 28 comprises a tie such as a string or a rope, which may be threaded through the channel 22, wrapped around the post 40, and tied to the post 40. In yet another embodiment, the connector 28 comprises a rebar tie which may be threaded through the channel 22 of the coil 12, wrapped around the post 40, and secured by twisting end portions of the rebar tie around each other. In a further embodiment, the connector 28 may be a strap 32 which comprises a bendable material which keeps its shape unless acted upon by a sufficient force. For example, a sheet metal may be used for the strap 32. The strap 32 may be threaded through the channel 22 of the coil 12 and tightly formed against an exterior of the post 40 to secure the coil 12 to the post 40. Various other clips, latches, or the like may be used for the connector 28.

For applications in electrical fencing, the coil 12 comprises an electrically insulating material, which may construct the entirety of the coil 12 or which may be a coating over an underlying material. The connector 28 of such embodiments also comprises an electrically insulating material, which may be different from or the same as the electrically insulating material of the coil 12. For example, the electrically insulating materials of the coil 12 and the connector 28 may be a plastic, a ceramic, or the like. The flexible material of the connector 28 may be one and the same with the electrically insulating material of the connector 28.

In use, the coil 12 is positioned around the fence wire 42, which extends through the channel 22. The coil 12 may be added to the fence wire 42 at any point on the fence wire 42 by receiving the fence wire 42 into the gaps 26 between axially adjacent portion 24*s* of the wire 14 of the coil 12 and turning the coil 12 until the fence wire 42 travels through all of the gaps 26 and is situated in the channel 22. The coil 12 may then be mounted to the post 40 by using the connector 28 as described above. To remove the coil 12 from the post 40, the connector 28 may be untied, untwisted, otherwise uncoupled, or severed. Zip ties 30 in particular may be cut and replaced as necessary when used as the connector 28.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fence wire mount comprising:

a coil comprising a wire having a pair of free ends, the wire having a pair of end sections and a helical section, each end section being adjacent to an associated free end of the pair of free ends, the helical section being coupled to and extending between the pair of end sections, the coil defining a channel which extends therethrough along an axis of the coil, the coil defining gaps between axially adjacent portions of the helical section of the wire, each gap having a width configured to accommodate a fence wire therein, each of the end sections being straight, the end sections being parallel to each other, the end sections being coplanar such that the channel through the coil section is offset and parallel to the plane defined by the end sections;

a connector, the connector being extended through the channel such that the connector is configured to couple the coil to a post such that the channel is parallel to a face of the post, wherein the connector is elongated, the connector being threadable through the channel of the coil, wherein the connector comprises a flexible material such that the connector is configured to wrap around the post.

2. The fence wire mount of claim 1, wherein the coil comprises an electrically insulating material.

3. The fence wire mount of claim 1, wherein the flexible material is electrically insulating, the connector comprising a zip tie.

4. The fence wire mount of claim 1, wherein the connector further comprises an electrically insulating material.

5. The fence wire mount of claim 1, wherein the wire comprises a flexible material such that the coil is expandable to accommodate the fence wire in each gap.

6. The fence wire mount of claim 1, wherein the helical section of the wire has a constant pitch.

7. A fence wire mount comprising:

a coil comprising a wire having a pair of free ends, the wire having a pair of end sections and a helical section, each end section being adjacent to an associated free end of the pair of free ends, the helical section being coupled to and extending between the pair of end sections, the coil defining a channel which extends therethrough along an axis of the coil, the coil defining gaps between axially adjacent portions of the helical section of the wire, each gap having a width configured to accommodate a fence wire therein, the wire comprising a flexible material such that the coil is expandable to accommodate the fence wire in each gap, the coil comprising an electrically insulating material, each end section of the pair of end sections being straight, the end sections being parallel to each other, the end sections being coplanar such that the channel through the coil section is offset and parallel to the plane defined by the end sections, the helical section of the wire having a constant pitch; and a connector, the connector being extended through the channel such that the connector is configured to couple the coil to a post such that the channel is parallel to a face of the post; the connector being elongated, the connector being threadable through the channel of the coil, the connector comprising a flexible material such that the connector is configured to wrap around the post, the flexible material being electrically insulating, the connector comprising a zip tie.

* * * * *